(12) United States Patent
Kozaki

(10) Patent No.: US 9,515,589 B2
(45) Date of Patent: Dec. 6, 2016

(54) MOTOR DRIVING DEVICE AND VACUUM PUMP

(71) Applicant: Shimadzu Corporation, Kyoto (JP)

(72) Inventor: Junichiro Kozaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 84 days.

(21) Appl. No.: 14/054,097

(22) Filed: Oct. 15, 2013

(65) Prior Publication Data

US 2014/0112801 A1 Apr. 24, 2014

(30) Foreign Application Priority Data

Oct. 23, 2012 (JP) ................................. 2012-233596
Sep. 11, 2013 (JP) ................................. 2013-188098

(51) Int. Cl.
*H02P 1/04* (2006.01)
*H02P 6/18* (2016.01)
*F04D 15/00* (2006.01)

(52) U.S. Cl.
CPC ........... *H02P 6/185* (2013.01); *F04D 15/0066* (2013.01); *H02P 21/18* (2016.02); *H02P 21/24* (2016.02)

(58) Field of Classification Search
CPC ..... F04B 49/065; H02P 21/0035; H02P 6/08
USPC ................ 417/44.1; 318/116, 400.1, 400.35, 318/400.04, 717; 75/375
See application file for complete search history.

(56) References Cited

U.S. PATENT DOCUMENTS

| | | | | |
|---|---|---|---|---|
| 5,057,759 | A | * | 10/1991 | Ueda ....................... H02P 21/13 318/561 |
| 6,121,736 | A | * | 9/2000 | Narazaki et al. ......... 318/400.35 |
| 2002/0047683 | A1 | * | 4/2002 | Kawashima .............. H02P 6/14 318/721 |

(Continued)

FOREIGN PATENT DOCUMENTS

| | | |
|---|---|---|
| CN | 101230858 A | 7/2008 |
| JP | 63-080774 | 4/1988 |
| JP | 08-256496 | 10/1996 |

OTHER PUBLICATIONS

English Translation of Chinese Office Action dated May 3, 2016 for corresponding Chinese Application No. 201310495910.7.

(Continued)

*Primary Examiner* — Eduardo Colon Santana
*Assistant Examiner* — Cortez Cook
(74) *Attorney, Agent, or Firm* — Renner, Otto, Boisselle & Sklar, LLP

(57) ABSTRACT

A motor driving device comprises: an inverter having a plurality of switching elements for driving a motor; an arithmetic section for calculating a rotational speed and a magnetic pole electric angle of a motor rotor based on information about a motor phase voltage and information about a motor phase current; a delay correcting section for correcting a phase delay of the magnetic pole electric angle calculated by the arithmetic section so as to generate corrected magnetic pole electric angle; a driving command generating section for generating a sinusoidal wave driving command based on a difference between the rotational speed and a target rotational speed and the corrected magnetic pole electric angle; and a PWM signal generating section for generating a PWM control signal for controlling on/off of the plurality of switching elements based on the sinusoidal wave driving command.

7 Claims, 16 Drawing Sheets

(56) References Cited

U.S. PATENT DOCUMENTS

| | | | |
|---|---|---|---|
| 2006/0043969 A1* | 3/2006 | Reinhold et al. | 324/251 |
| 2006/0176005 A1* | 8/2006 | Ta | H02P 6/182 318/650 |
| 2006/0197480 A1* | 9/2006 | Mori | H02P 6/15 318/400.04 |
| 2007/0002505 A1* | 1/2007 | Watanabe et al. | 361/23 |
| 2007/0069681 A1* | 3/2007 | Imura | H02P 6/182 318/717 |
| 2008/0034922 A1* | 2/2008 | Bruce | C21C 7/10 75/375 |
| 2008/0048598 A1* | 2/2008 | Shibuya | 318/400.1 |
| 2008/0080984 A1 | 4/2008 | Tanigawa et al. | |
| 2009/0322261 A1* | 12/2009 | Araki | 318/116 |
| 2010/0194319 A1* | 8/2010 | Ito et al. | 318/400.13 |

OTHER PUBLICATIONS

English translation of Chinese Office Action dated Nov. 2, 2015 for corresponding Chinese Application No. 201310495910.7.
Jiang Wenqi et al., "The Design of Refrigerator Compressor Control System Based on Vector Control Technology", Compressor Technology No. 5, May 2010 and English Abstract.

* cited by examiner

MOTOR DRIVING DEVICE AND VACUUM PUMP

BACKGROUND OF THE INVENTION

1. Field of the Invention

The present invention relates to a motor driving device for driving a motor and a vacuum pump having the motor driving device.

2. Description of the Related Art

In vacuum pumps such as turbo-molecular pumps for rotating rotors at a high speed so as to carry out evacuation, DC brushless motors are frequently used as motors for driving to rotate rotors. In vacuum pumps that do not use rotation sensors, rotational speed information and magnetic pole position information of motor rotors necessary for rotation driving are estimated based on detection signals relating to a three-phase voltage and a three-phase current of motors.

In general, voltages that are modulated into a sinusoidal wave shape and modulated into a PWM signal by inverters are applied to motors. Such a voltage is generated by on/off control of a switching element, and has a voltage waveform of a rectangular wave that steeply changes. For this reason, a detected three-phase voltage detection signal and a three-phase current detection signal are allowed to pass through a low-pass filter so that a high frequency noise is removed. The rotational speed information and the magnetic pole position information of motor rotors are estimated by using the detection signals from which high frequency noises are removed.

However, when the low-pass filter removes the high frequency noises, a signal delay occurs in passed basic wave component (sinusoidal wave component). For this reason, an unignorable error is caused between an actual magnetic pole position and an estimated magnetic pole position, and stability is deteriorated in a control system where a cycle of rotation driving→voltage and current detection→magnetic pole position estimating operation is repeated, so that a higher harmonic wave that is the integral multiple of a rotational frequency increases. When the higher harmonic wave is overlapped with a basic wave of the rotational frequency, the basic wave is distorted from the sinusoidal wave. As a result, when an operating load is heavy, flow ripple of the motor current or step-out of the motor occasionally occurs.

SUMMARY OF THE INVENTION

A motor driving device of the present invention comprises an inverter having a plurality of switching elements for driving a motor; an arithmetic section for calculating a rotational speed and a magnetic pole electric angle of a motor rotor based on information about a motor phase voltage and information about a motor phase current; a delay correcting section for correcting a phase delay of the magnetic pole electric angle calculated by the arithmetic section so as to generate corrected magnetic pole electric angle; a driving command generating section for generating a sinusoidal wave driving command based on a difference between the rotational speed and a target rotational speed and the corrected magnetic pole electric angle; and a PWM signal generating section for generating a PWM control signal for controlling on/off of the plurality of switching elements based on the sinusoidal wave driving command.

Preferably the information about the motor phase voltage is a motor phase voltage detection signal input via a first low-pass filter, and the information about the motor phase current is a motor phase current detection signal input via a second low-pass filter. The delay correcting section calculates a leading phase for correcting a phase delay caused by filter characteristics of the first low-pass filter, and adds the leading phase to the magnetic pole electric angle so as to generate the corrected magnetic pole electric angle.

Preferably the delay correcting section calculates the leading phase according to the rotational speed calculated by the arithmetic section.

Preferably filter characteristics of the second low-pass filter are set so as to be identical to the filter characteristics of the first low-pass filter.

Preferably the information about the motor phase current is a motor phase current detection signal input into the arithmetic section via the low-pass filter, the delay correcting section calculates a leading phase for correcting a phase delay caused by filter characteristics of the low-pass filter, and adds the leading phase to the magnetic pole electric angle so as to generate the corrected magnetic pole electric angle, the driving command generating section generates two-phase voltage commands Vd and Vq in the two-phase rotary coordinate system based on the difference, converts the two-phase voltage commands Vd and Vq into two-phase voltage commands vα and vβ in a two-phase fixed coordinate system based on the corrected magnetic pole electric angle, two-phase-to-three-phase converts the two-phase voltage commands vα and vβ so as to generate the three-phase voltage commands Vu, Vv and Vw, and generates the PWM control signal based on the three-phase voltage commands Vu, Vv and Vw, the arithmetic section calculates the rotational speed and the magnetic pole electric angle based on an estimated motor voltage obtained by delaying phase of the two-phase voltage commands vα and vβ in the two-phase fixed coordinate system by the same phase amount as the leading phase, and the motor current detection signal.

Preferably the delay correcting section calculates the leading phase according to the rotational speed calculated by the arithmetic section.

Preferably the motor driving device further comprises: a motor phase voltage detecting section for detecting a motor phase voltage; a low-pass filter for performing a low-pass filter process on a motor phase voltage detection signal output from the motor phase voltage detecting section; a three-shunt type current detecting section for detecting a motor phase current through a shunt resistor provided to a ground side of the switching element of the inverter; and a signal delay processing section for delaying a motor phase current detection signal that is output from the current detecting section and is analog-digital converted by a phase equivalent to the phase delay of the motor phase voltage detection signal through the low-pass filter according to a digital process. Information about the motor phase voltage is a motor phase voltage detection signal that is analog-digital converted after the filter process is performed by the low-pass filter, information about the motor phase current is a phase corrected current detection signal output from the signal delay processing section, the delay correcting section calculates a leading phase for correcting the phase delay caused by the filter characteristics of the low-pass filter, and adds the leading phase to the magnetic pole electric angle so as to generate the corrected magnetic pole electric angle.

Preferably the digital process is a low-pass filter process through a digital low-pass filter.

A vacuum pump of the present invention comprises a pump rotor formed with an exhaust function section; a motor for driving to rotate the pump rotor; and the motor driving device.

DETAILED DESCRIPTION OF PREFERRED EMBODIMENTS

Figure 1:
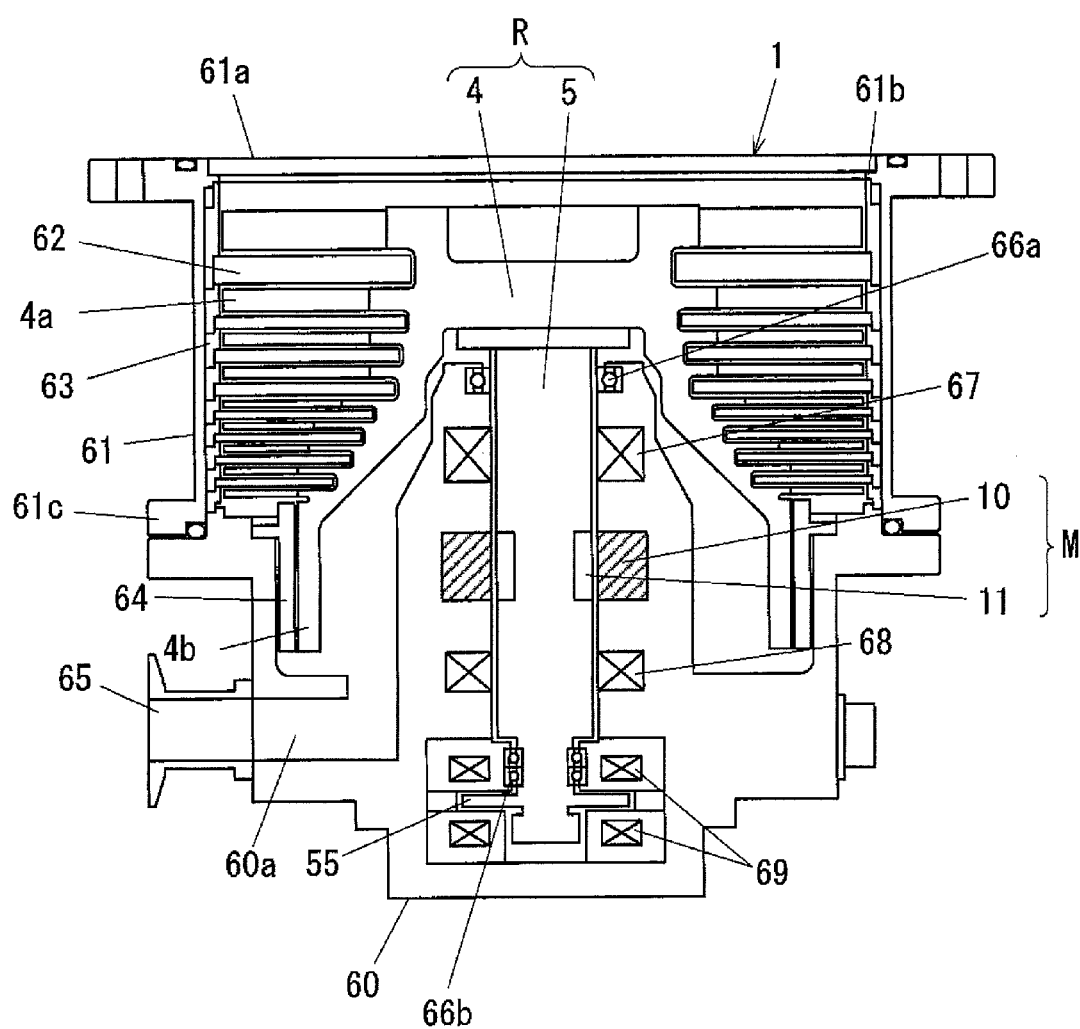
FIG. 1 is a cross-sectional view illustrating a schematic constitution of a pump unit provided to a vacuum pump.

Embodiments for carrying out the present invention are described below with reference to the drawings.
First Embodiment FIG. 1 is a diagram illustrating a constitution of a pump unit 1 in a vacuum pump according to the embodiment. The vacuum pump has the pump unit 1 and a control unit (not show) for driving the pump unit 1 shown in FIG. 1. The vacuum pump shown in FIG. 1 is a magnetic levitation style turbo-molecular pump.

The pump unit 1 has a turbo pump stage composed of a rotor blade 4a and a stator blade 62, and a drag pump stage (a thread groove pump) composed of a cylindrical section 4b and a screw stator 64. The thread groove is formed on the side of the screw stator 64, but the thread groove may be formed on the side of the cylindrical section 4b. The rotor blade 4a and the cylindrical section 4b as a rotation-side evacuating function section are formed on a pump rotor 4. The pump rotor 4 is fastened to a shaft 5. The pump rotor 4 and the shaft 5 compose a rotor unit R.

Plural stages of the stator blades 62 and the rotor blades 4a are arranged alternately with respect to an axial direction. Each of the stator blades 62 is placed on a base 60 via each spacer ring 63. When a fixed flange 61c of a pump case 61 is fixed to the base 60 by a bolt, the laminated spacer rings 63 are held between the base 60 and a locking section 61b of the pump case 61 so that the stator blade 62 is located.

The shaft 5 is supported by magnetic bearings 67, 68 and 69 provided to the base 60 in a non-contact manner. Each of the magnetic bearings 67, 68 and 69 has an electromagnet and a displacement sensor. The displacement sensor detects a levitation position of the shaft 5. The electromagnet composing the magnetic bearing 69 in an axial direction is arranged so as to hold a rotor disc 55 in the axial direction that is provided to a lower end of the shaft 5. The shaft 5 is driven to be rotated by a motor M.

The motor M is a synchronous motor, and in this embodiment, a DC brushless motor is used. The motor M has a motor stator 10 arranged on the base 60, and a motor rotor 11 provided to the shaft 5. The motor rotor 11 is provided with a permanent magnet. When the magnetic bearings do not operate, the shaft 5 is supported by emergency mechanical bearings 66a and 66b.

An exhaust opening 60a of the base 60 is provided with an exhaust port 65, and a back pump is connected to the exhaust port 65. When the rotor unit R is magnetically levitated and is simultaneously driven by the motor M to be rotated at a high speed, gaseous molecules on the side of a suction port 61a are exhausted to the exhaust port 65.

Figure 2:
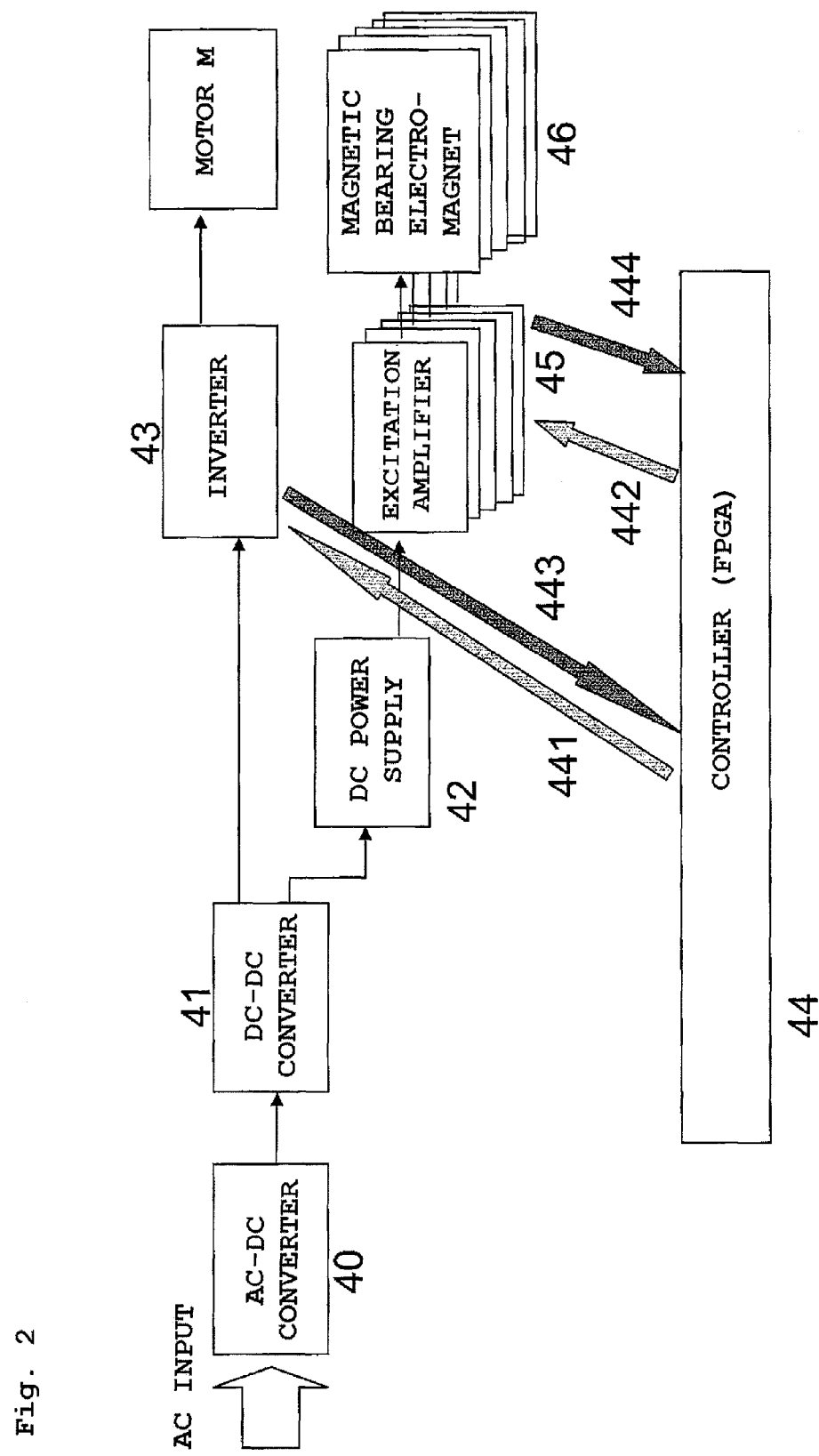
FIG. 2 is a block diagram illustrating a schematic constitution of a control unit.

FIG. 2 is a block diagram illustrating a schematic constitution of a control unit. An AC input from an outside is converted into a DC output (DC voltage) by an AC/DC converter 40 provided to the control unit. The DC voltage output from the AC/DC converter 40 is input into a DC/DC converter 41, and the DC/DC converter 41 generates the DC voltage for the motor M and the DC voltage for the magnetic bearings.

The DC voltage for the motor M is input into an inverter 43. The DC voltage for the magnetic bearings is input into a DC power supply 42 for the magnetic bearings. The magnetic bearings 67, 68 and 69 compose the five-axis magnetic bearing, each of the magnetic bearings 67 and 68 has two pairs of electromagnets 46, and the magnetic bearing 69 has a pair of electromagnets 46. An electric current is supplied to five pairs of the electromagnets 46, namely, the ten electromagnets 46 individually from ten excitation amplifiers 45 provided for them.

A controller 44 is a digital arithmetic unit for controlling the motor and the magnetic bearings, and for example, FPGA (Field Programmable Gate Array) is used. The controller 44 outputs a PWM control signal 441 for controlling ON/OFF of a plurality of switching elements included in the inverter 43 to the inverter 43, and outputs a PWM control signal 442 for controlling ON/OFF of switching elements included in the excitation amplifiers 45 to the excitation amplifiers 45. Further, as described later, a signal 443 relating to a phase voltage and a phase current relating to the motor M, an excitation current signal and a displacement signal 444 relating to the magnetic bearings are input into the controller 44.

Figure 3:
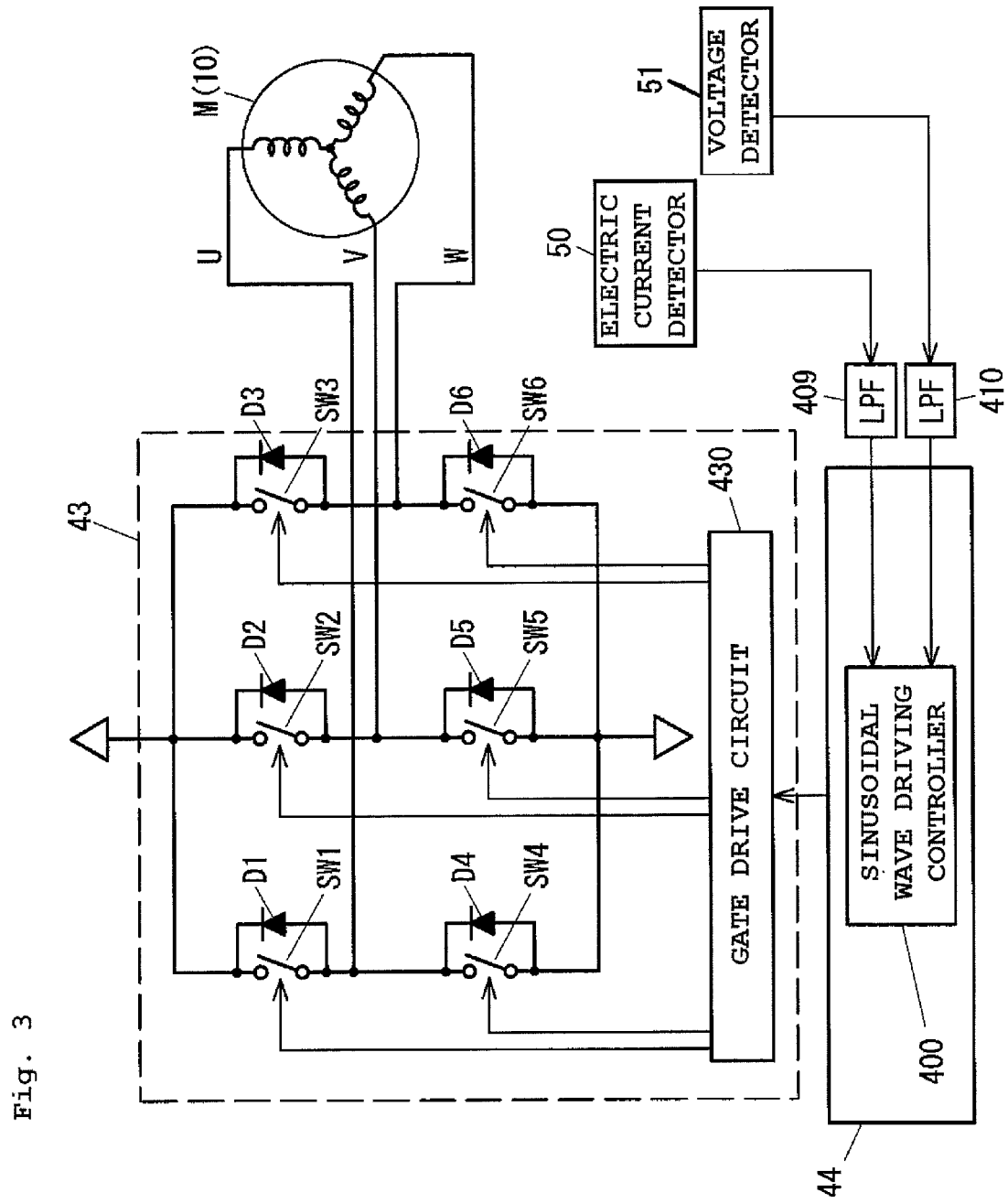
FIG. 3 is a diagram illustrating a motor driving control system relating to a motor.

FIG. 3 is a diagram illustrating a motor driving control system relating to a motor M. The motor driving control system has a sinusoidal wave driving controller 400 and the inverter 43. The inverter 43 has a plurality of the switching elements SW1 to SW6, and a gate drive circuit 430 for driving the switching elements SW1 to SW6 to ON/OFF. As the switching elements SW1 to SW6, a power semiconductor element, such as MOSFET or IGBT, is used. Reflux diodes D1 to D6 are connected to the switching elements SW1 to SW6, respectively, in parallel.

Electric currents flowing in U, V and W-phase coils of the motor stator 10 are detected by a current detecting section 50, and current detection signals as detected results are input into the sinusoidal wave driving controller 400 of the controller 44 via the low-pass filter 409. Further, terminal voltages of U, V and W-phase coils are detected by a voltage detecting section 51, and voltage detection signals as detected results are input into the sinusoidal wave driving controller 400 via a low-pass filter 410.

The sinusoidal wave driving controller 400 generates a PWM control signal for controlling ON/OFF of the switching elements SW1 to SW6 based on the current detection signals and the voltage detection signals from which noises are removed by the low-pass filters 409 and 410. The gate drive circuit 430 generates a gate driving signal based on the PWM control signal, and turns on/off the switching elements SW1 to SW6. As a result, the voltages that are modulated into a sinusoidal wave and undergoes PWM are applied to the U, V and W-phase coils respectively.

In this embodiment, a rotational speed and a magnetic pole position are estimated based on motor current detection signals and motor voltage detection signals. In a case of a sensorless motor without a rotation sensor for detecting a rotating position of the motor rotor 11 like this embodiment, the rotational speed and the magnetic pole position are generally estimated based on the motor current detection signals and the motor voltage detection signals.

Figure 4:
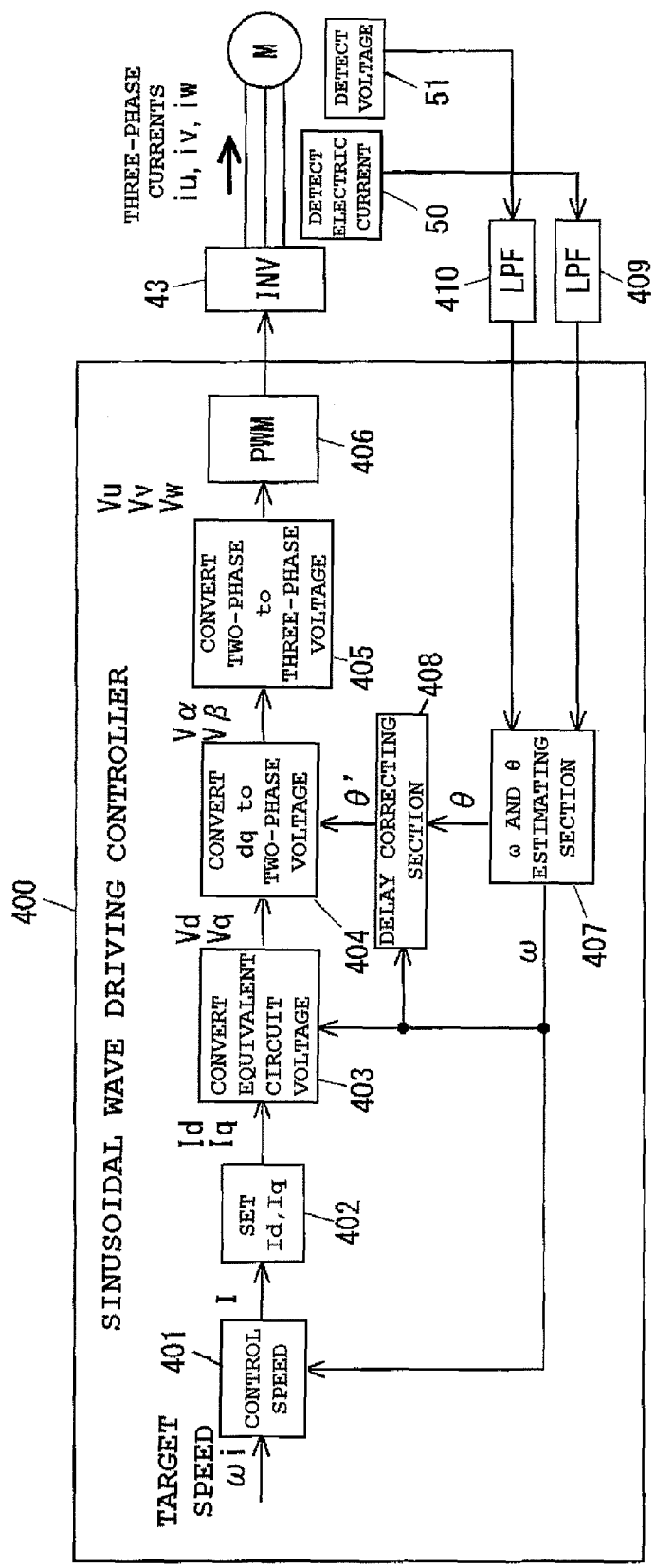
FIG. 4 is a block diagram describing a sinusoidal wave driving controller.

FIG. 4 is a block diagram describing a sinusoidal wave driving controller 400. A three-phase current flowing in the motor M is detected by the current detecting section 50, and a detected current detection signal is input into the low-pass filter 409. On the other hand, a terminal voltage of the motor M is detected by the voltage detecting section 51, and a detected voltage detection signal is input into the low-pass filter 410.

Figure 6:
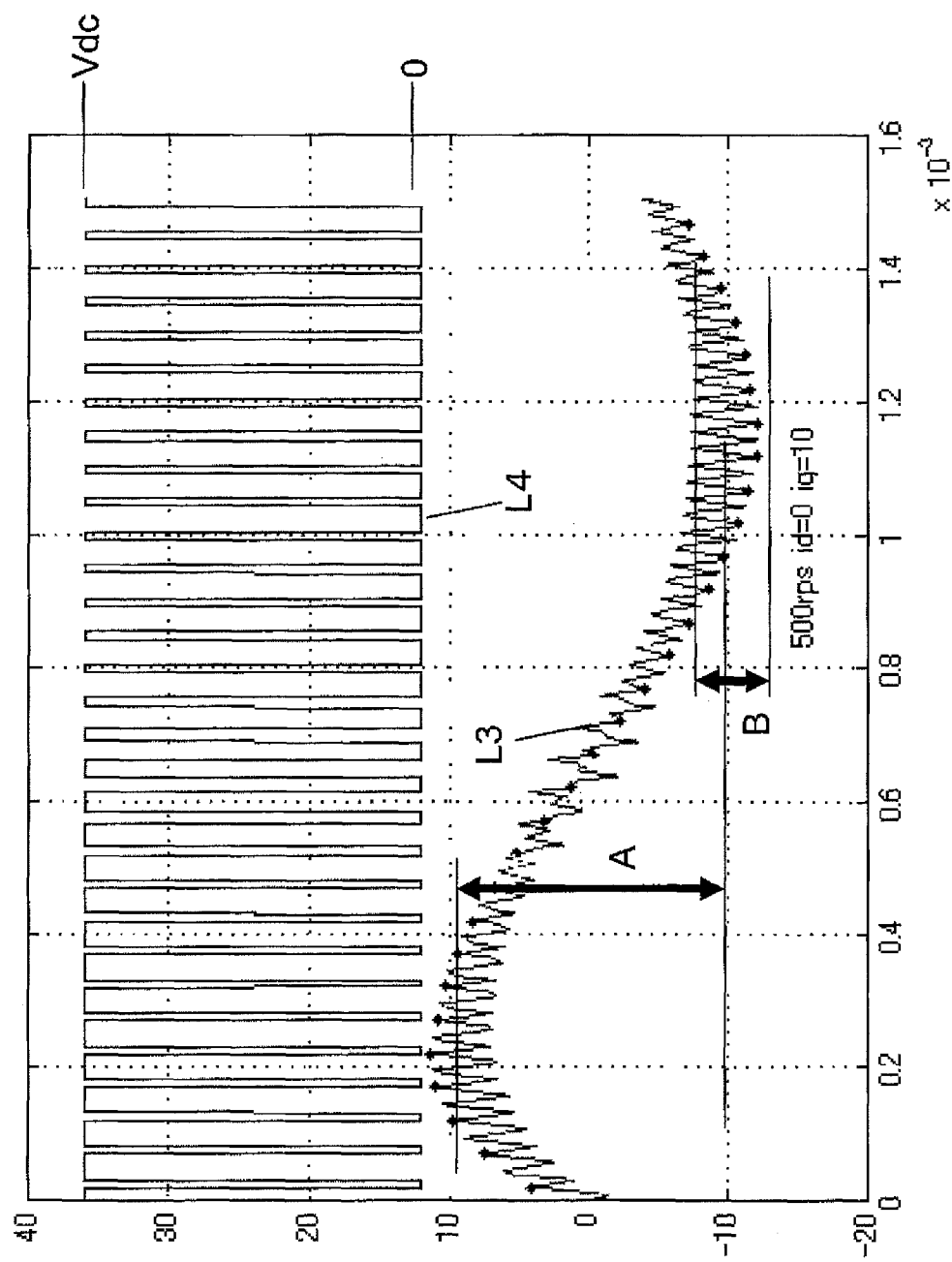
FIG. 6 is a diagram illustrating one example of a voltage to be applied to the motor that undergoes PWM sinusoidal wave driving and an electric current flowing in the motor.

FIG. 6 is a diagram illustrating one example of a GND-based U-phase voltage applied to the motor M that is PWM sinusoidal wave-driven and a U-phase electric current flowing in the motor M. A line L3 indicates a U-phase current, and a line L4 shown above the line L3 indicates a GND-based voltage applied to the U-phase coil. The phase voltage L4 has a rectangular waveform that is PWM modulated, and a width of the rectangular wave (on-duty) changes in a form of sinusoidal wave. As a result, the U-phase current flowing in the U-phase coil also changes in the form of sinusoidal wave.

A voltage to be applied to the motor has a rectangular waveform that steeply changes between 0 V and a power supply voltage Vdc according to ON/OFF of the switching elements. The on-duty of the rectangular wave of the voltage L4 changes in the form of sinusoidal wave due to Pulse width modulation. When such a voltage is applied, an electric current with a shape of sinusoidal wave (amplitude A) indicated by the line L3 flows in the motor. Ripple amplitude B occurs in the phase current L3 according to rising and falling of the rectangular wave.

Figure 13:
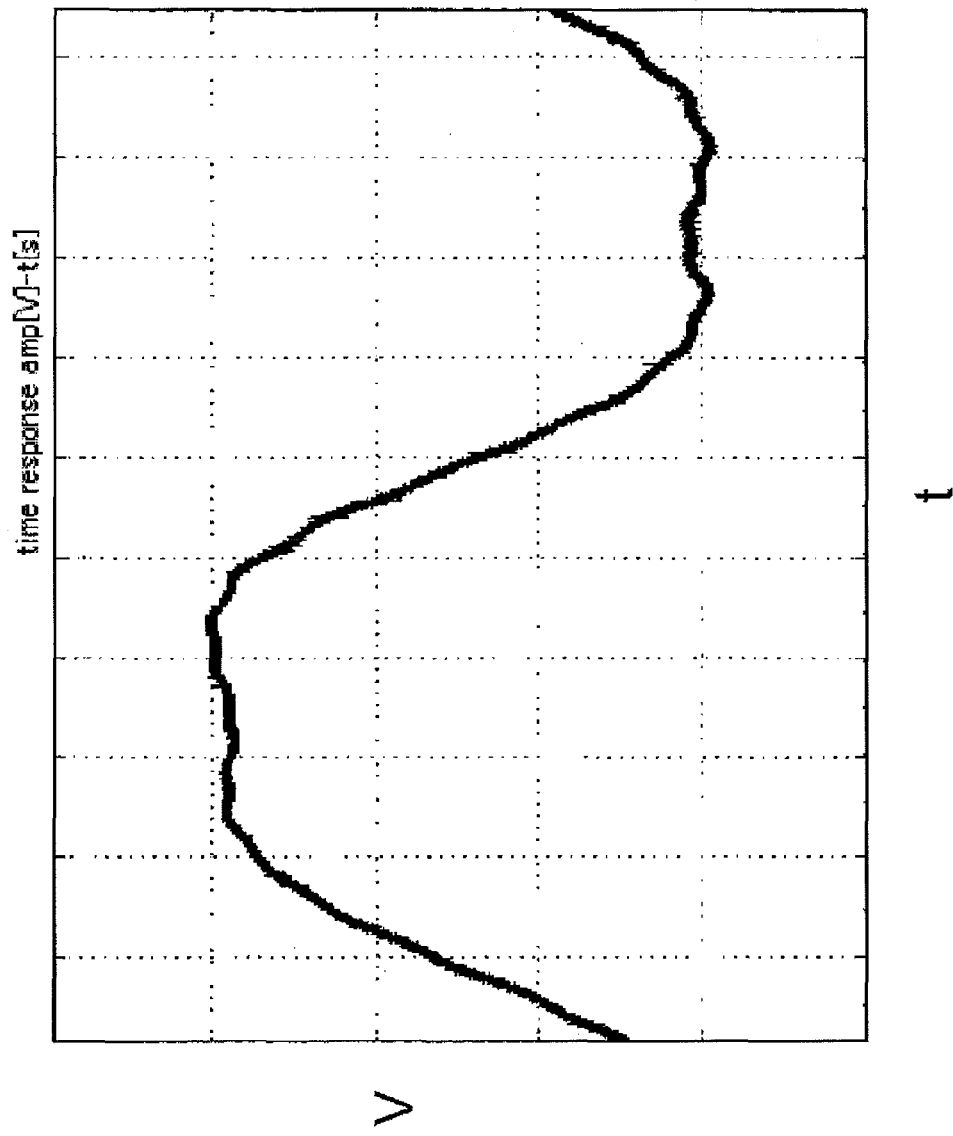
FIG. 13 is a diagram illustrating a voltage waveform after filtering in a low-pass filter.

The phase current L3 has a waveform that is overlapped with a ripple component (high frequency wave) of a PWM carrier frequency. For this reason, the low-pass filters 409 and 410 for removing high frequency noises are provided to the input lines of the current detection signals and the voltage detection signals, respectively. Since particularly the voltage detection signals have more high-frequency components than a basic wave component, the voltage detection signals require filtering that is stricter than that of the current detection signals. FIG. 13 is a diagram illustrating a voltage waveform (GND-based U-phase voltage) that has been filtered by the low-pass filter 410. It is found that a high frequency component is removed from a voltage waveform with a shape of rectangular wave shown in FIG. 6 so as to be close to the waveform of the sinusoidal wave.

The current detection signals that pass through the low-pass filter 409 and the voltage detection signals that pass through the low-pass filter 410 are input into a rotational speed/magnetic pole position estimating section 407. The rotational speed/magnetic pole position estimating section 407 estimates a rotational speed ω and a magnetic pole position (an electrical angle θ) of the motor M based on the current detection signals and the voltage detection signals. Since the magnetic pole position is expressed by the electrical angle θ, hereinafter, the magnetic pole position is called a magnetic pole electric angle θ.

Figure 5:
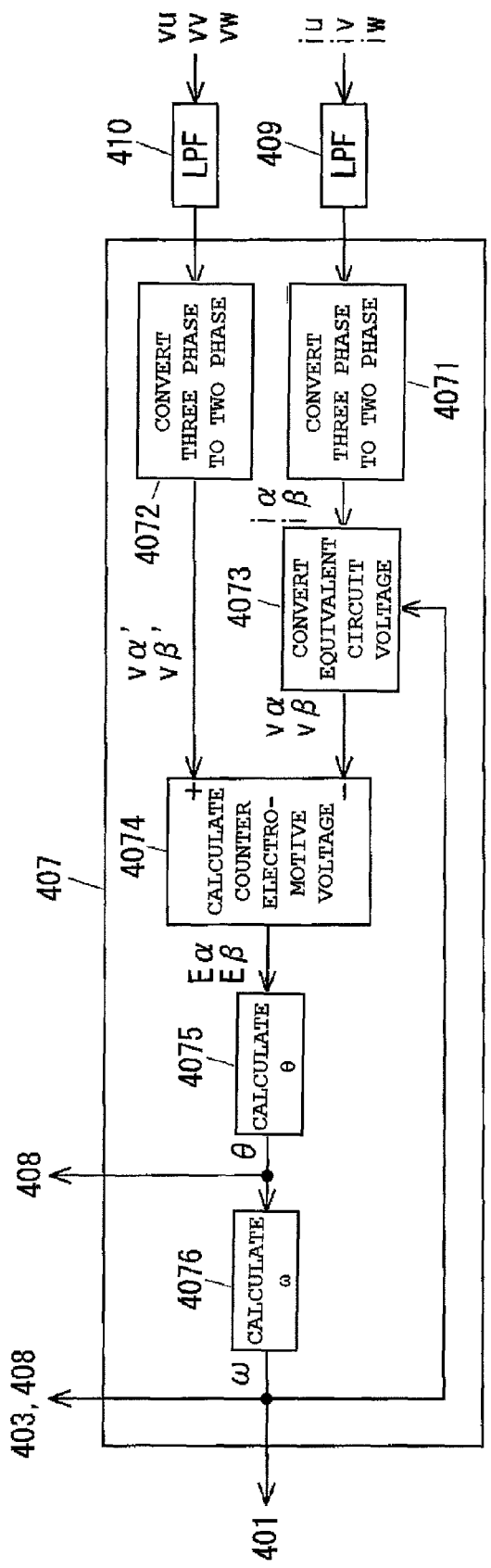
FIG. 5 is a diagram illustrating details of a rotational speed/magnetic pole position estimating section.

FIG. 5 is a diagram illustrating details of a rotational speed/magnetic pole position estimating section 407. Phase voltage detection signals vv, vu and vw output from the voltage detecting section 51 are input into a three-phase-to-two-phase converting section 4072 via the low-pass filter 410. The three-phase-to-two-phase converting section 4072 converts tree-phase voltage signals into two-phase voltage signals vα' and vβ'. The converted voltage signals vα' and vβ' are input into a counter electromotive voltage arithmetic section 4074.

On the other hand, phase current detection signals iv, iu and iw output from the current detecting section 50 are input into a three-phase-to-two-phase converting section 4071 via the low-pass filter 409. The three-phase-to-two-phase converting section 4071 converts three-phase current detection signals iv, iu and iw into two-phase current signals iα and iβ. The converted current signals iα and iβ are input into an equivalent circuit voltage converting section 4073.

The equivalent circuit voltage converting section 4073 converts the current signals iα and iβ into voltage signals vα and vβ using the following formula (1) based on an electric equivalent circuit constant of the motor M. The converted voltage signals vα and vβ are input into the counter electromotive voltage arithmetic section 4074. The equivalent circuit is divided into a resistance component r and an inductance component L. Values r and L are obtained from motor specifications and are stored in a storage section in advance.

[Formula 1]

$$\begin{pmatrix} v\alpha \\ v\beta \end{pmatrix} = \begin{pmatrix} r & -\omega L \\ \omega L & r \end{pmatrix} \begin{pmatrix} i\alpha \\ i\beta \end{pmatrix} \quad (1)$$

The counter electromotive voltage arithmetic section 4074 calculates counter electromotive voltages Eα and Eβ using the following formula (2) according to the voltage signals vα' and vβ' based on motor three-phase voltages and the voltage signals vα and vβ based on motor three-phase currents.

[Formula 2]

$$\begin{pmatrix} E\alpha \\ E\beta \end{pmatrix} = \begin{pmatrix} v\alpha' \\ v\beta' \end{pmatrix} - \begin{pmatrix} v\alpha \\ v\beta \end{pmatrix} \quad (2)$$

An electric angle arithmetic section 4075 calculates the magnetic pole electric angle θ where a magnetic pole position of the motor rotor 11 is expressed by an electric angle based on the counter electromotive voltages Eα and Eβ according to the following formula (3). As to the magnetic pole electric angle θ, a timing at which the magnetic pole N matches with the position of the U-phase coil of the motor stator 10 is set so that θ=0. The calculated magnetic pole electric angle θ is input into a rotational speed arithmetic section 4076 and a delay correcting section 408 shown in FIG. 4 respectively.

[Formula 3]

$$\theta = \tan^{-1}(-E\alpha/E\beta) \quad (3)$$

The rotational speed arithmetic section 4076 calculates the rotational speed ω based on the input magnetic pole electric angle θ according to the following formula (4). The calculated rotational speed ω is input into the equivalent circuit voltage converting section 4073, a speed controller 401, an equivalent circuit voltage converter 403 and the delay correcting section 408 shown in FIG. 4.

[Formula 4]

$$\omega = \Delta\theta/\Delta t \quad (4)$$

Figure 7:
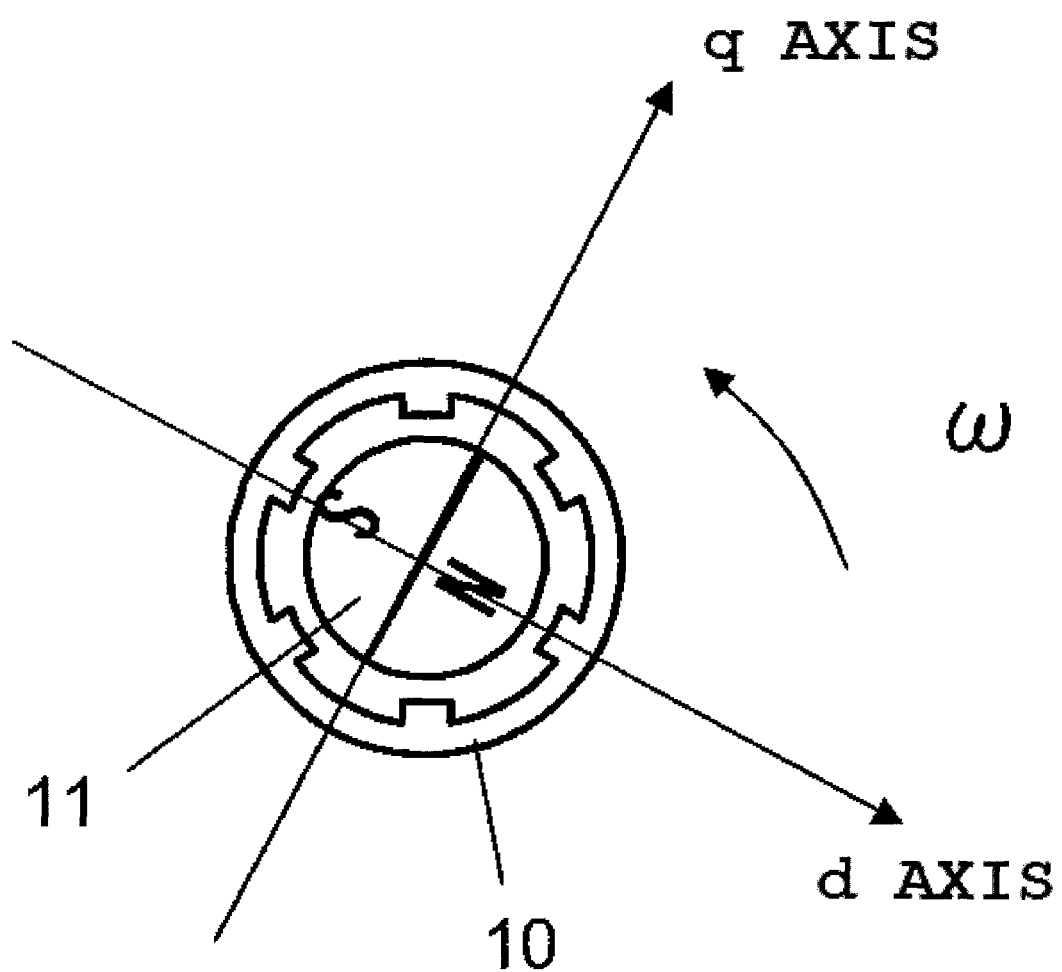
FIG. 7 is a diagram illustrating directions of d axis and q axis.

With reference to FIG. 4, the speed controller 401 makes PI control (proportional control and integral control) or P control (proportional control) based on a difference between an input target rotational speed ωi and the estimated present rotational speed ω so as to output a current command I. An Id/Iq setting section 402 sets current commands Id and Iq in a d-q axis rotating system of coordinates based on the current command I. As shown in FIG. 7, the d axis in d-q axis rotating system of coordinates is a coordinate axis in which the N pole of the rotating motor rotor 11 is a positive direction. The q axis is a coordinate axis that advances by 90° and is at a right angle to the d axis, and its direction is a direction of a counter electromotive voltage.

The equivalent circuit voltage converter 403 converts the current commands Id and Iq into voltage commands Vd and Vq in the d-q axis rotating system of coordinates using the following formula (5) based on the calculated rotational speed ω and the electric equivalent circuit constant of the motor M.

[Formula 5]

$$\begin{pmatrix} Vd \\ Vq \end{pmatrix} = \begin{pmatrix} r & -\omega L \\ \omega L & r \end{pmatrix} \begin{pmatrix} Id \\ Iq \end{pmatrix} \quad (5)$$

A dq-two-phase voltage converter 404 converts the voltage commands Vd and Vq in the d-q axis rotating system of coordinates into voltage commands Vα and Vβ in a two-axis fixed coordinate system (α-β coordinate system) based on the converted voltage commands Vd and Vq and a corrected magnetic pole electric angle θ' input from the delay correcting section 408. When the voltage signals and the current signals are filtered by the low-pass filters 409 and 410, a signal delay is caused in a basic wave component (sinusoidal wave component). For this reason, unignorable error is caused between an actual magnetic pole electric angle and an estimated magnetic pole electric angle.

Figure 8:
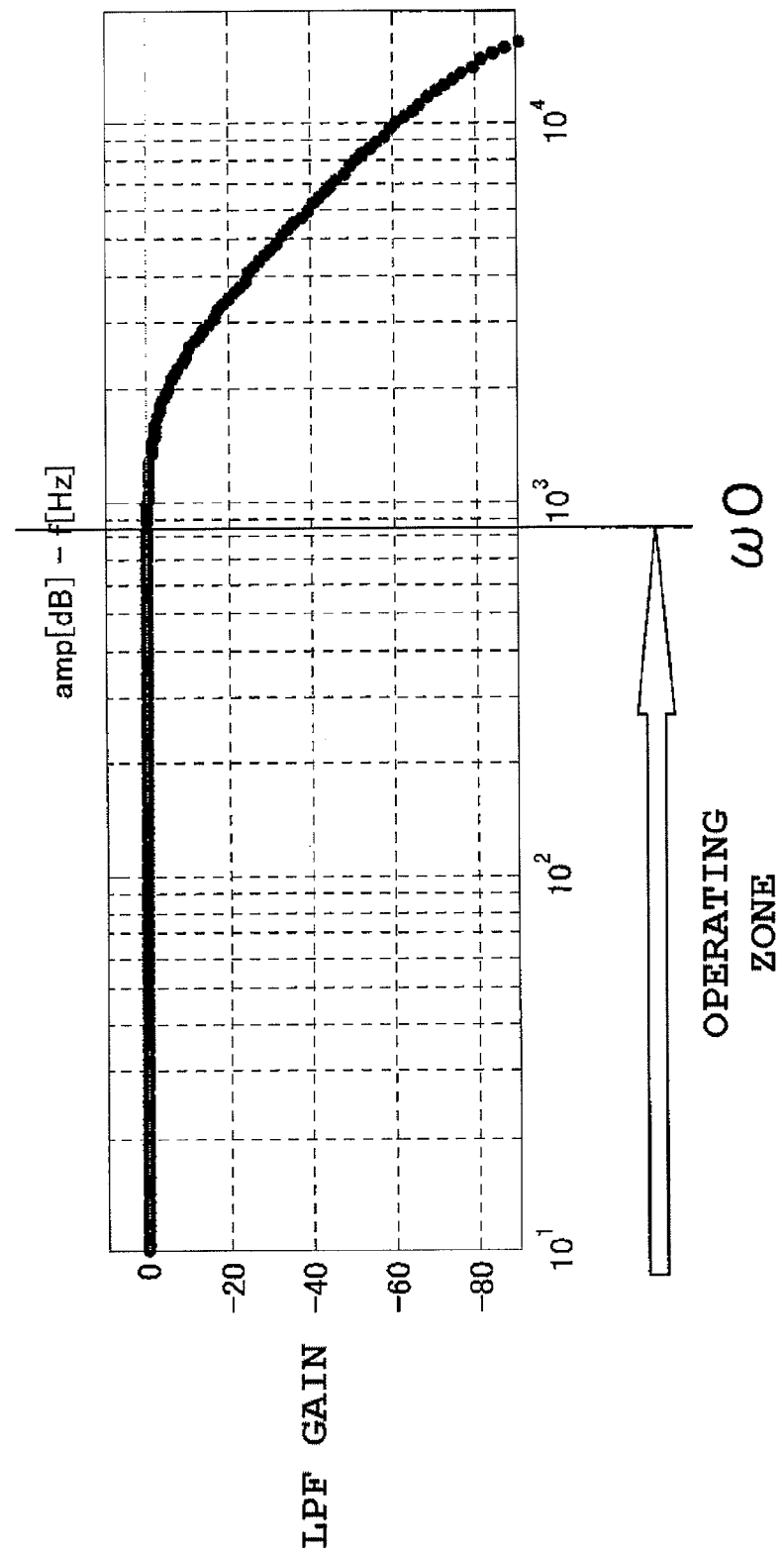
FIG. 8 is a diagram illustrating one example of gain characteristics of a low-pass filter.
Figure 9:
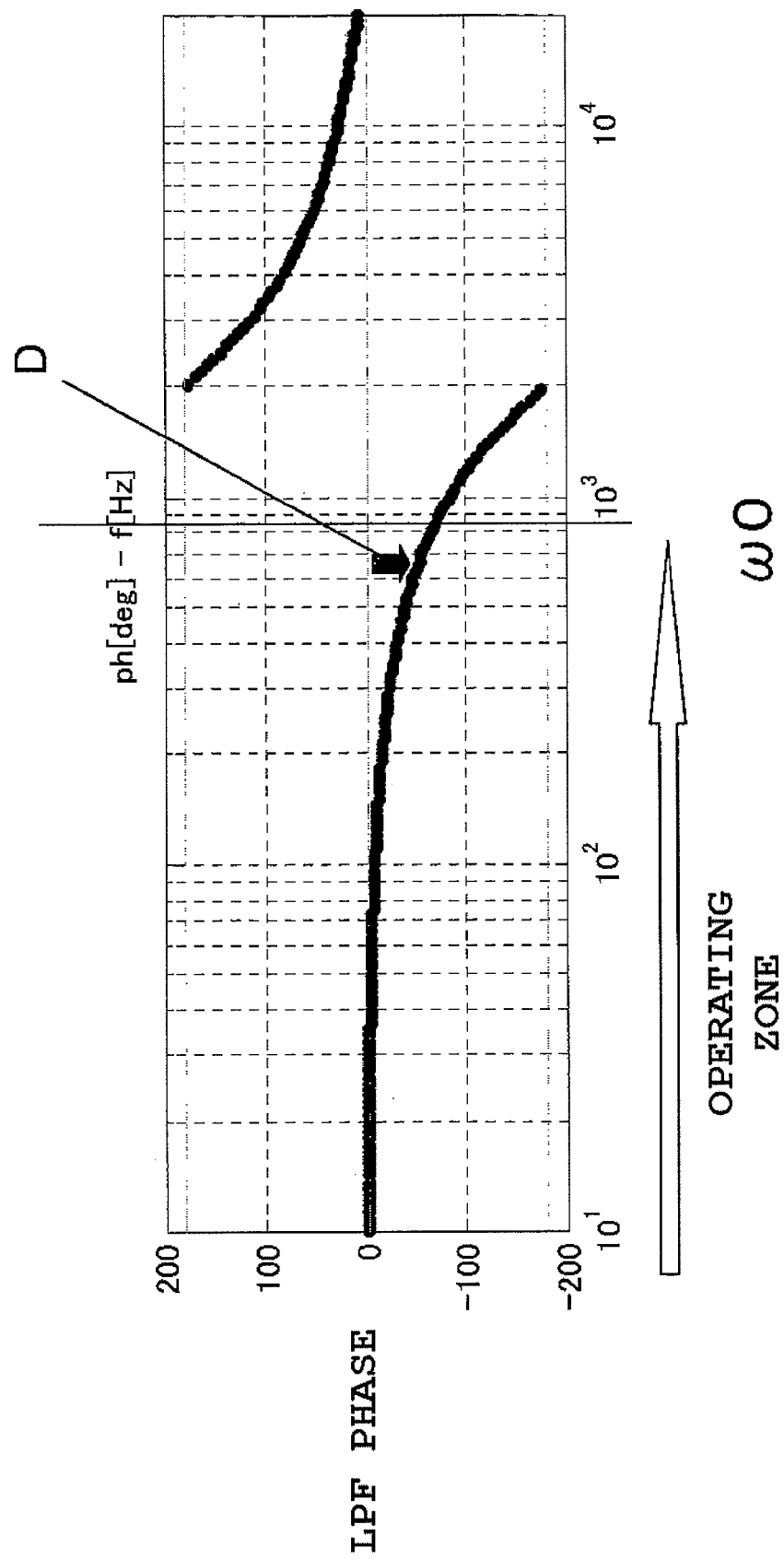
FIG. 9 is a diagram illustrating one example of phase characteristics of the low-pass filter.

FIGS. 8 and 9 are diagrams illustrating one example of filter characteristics of the low-pass filter. FIG. 8 is a diagram illustrating a gain, and FIG. 9 is a diagram illustrating a phase. In FIGS. 8 and 9, angular velocity from 0 to ω0 is a pump operating zone. In FIG. 9, a minus phase indicated by an arrow D shows a phase delay. In the operating zone, as the rotational speed ω is higher, the phase delay is longer. For this reason, when the dq-two-phase voltage converter 404 performs conversion using the magnetic pole electric angle θ at which the phase delay occurs, a shift between a phase of a rotating magnetic field on the side of the motor stator and a phase of the motor rotor 11 becomes large, and thus step-out might occur.

In this embodiment, in order to solve such a problem caused by the phase delay, the delay correcting section 408 for correcting the phase delay is provided. The delay correcting section 408 calculates the corrected magnetic pole electric angle θ' according to the following formula (6) based on the magnetic pole electric angle θ and the rotational speed ω input from the rotational speed/magnetic pole position estimating section 407.

[Formula 6]

$$\theta' = \theta + \phi(\omega) \quad (6)$$

Figure 10:
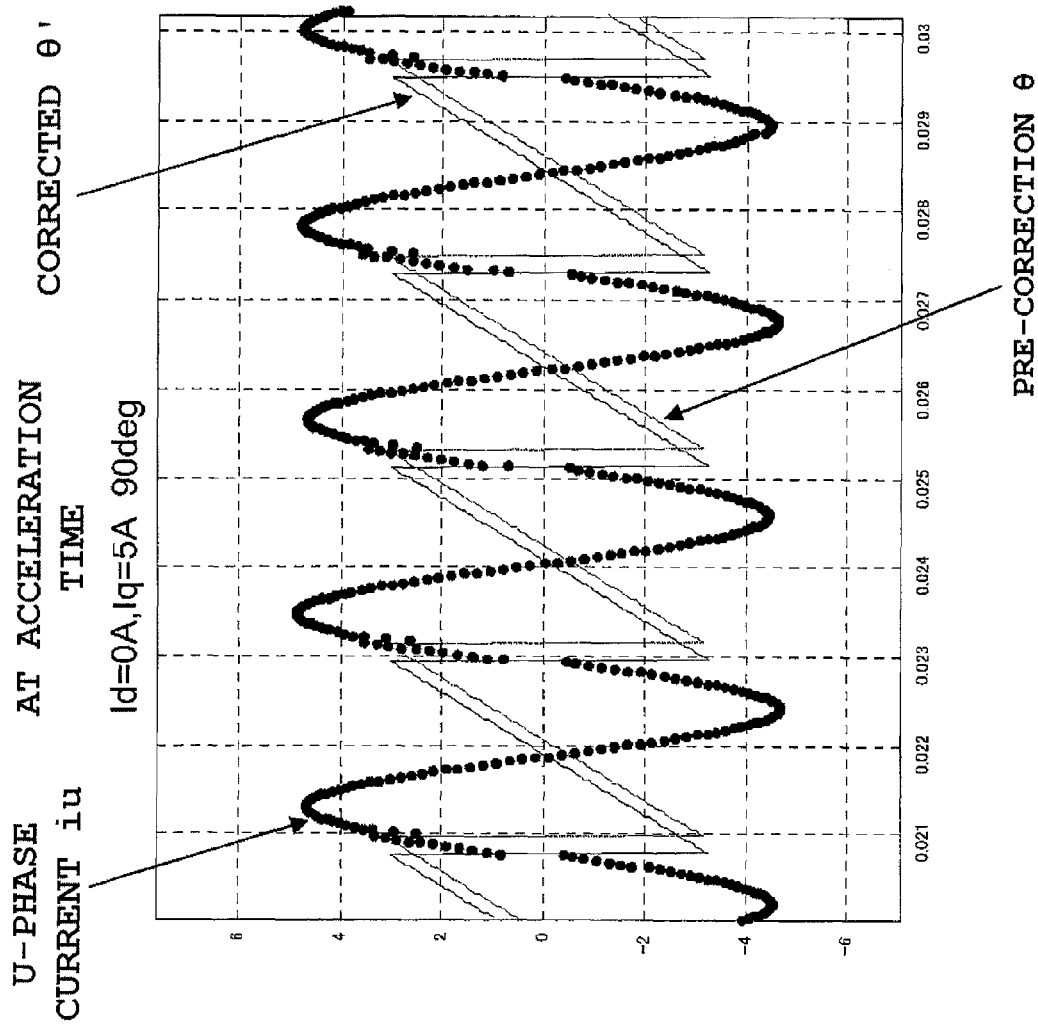
FIG. 10 is a diagram illustrating a U-phase current iu, a pre-correction magnetic pole electric angle θ, a corrected magnetic pole electric angle θ'.

In the formula (6), a leading phase φ(ω) represents how much the phase leads with respect to the magnetic pole electric angle θ. The leading phase φ(ω) is determined based on filter characteristics shown in FIG. 9. For example, a curved line portion may be approximated by a straight line of constant slope, or the operating zone may be divided into a plurality of zones so that the value may be set for each of zones. Further, the phase delay in a maximum rotational speed (rotational speed at a time of rated rotation) ω0 may be determined as φ0 (>0), and in a simplified manner, φ(ω)=φ0×(ω/ω0). FIG. 10 is a diagram illustrating a U-phase current iu, a pre-correction magnetic pole electric angle θ, a corrected magnetic pole electric angle θ'. A timing at which a corrected magnetic pole electric angle θ'=0 approximately matches with a timing at which U-phase current iu=0.

The rotational speed of the motor rotor 11 during the high-speed rotation does not abruptly change within one cycle of the rotation due to rotary inertia of the rotor, and thus can only change slowly with at least a several cycles. For this reason, it can be regarded that steady-state response is made. As a result, comparatively simple means for adding a delay correction amount φ(ω) to the electrical angle θ can produce an effect.

The dq-two-phase voltage converter 404 converts the voltage commands Vd and Vq in the d-q axis rotating system of coordinates into voltage commands Vα and Vβ in the two-axis fixed coordinate system (α-β coordinate system) based on the converted voltage commands Vd and Vq and the corrected magnetic pole electric angle θ'. A two-phase-to-three-phase voltage converting section 405 converts the two-phase voltage commands Vα and Vβ into three-phase voltage commands Vu, Vv and Vw. A PWM signal generating section 406 generates a PWM control signal for turning on/off (conductive or cut off) the six switching elements SW1 to SW6 provided to the inverter 43 based on the three-phase voltage commands Vu, Vv and Vw. The inverter 43 turns on/off the switching elements SW1 to SW6 based on the PWM control signal input from the PWM signal generating section 406 so as to apply a driving voltage to the motor M.

In the first embodiment, when the rotational speed ω and the magnetic pole electric angle θ are calculated based on a motor phase voltage detection signal input via the low-pass filter 410 and a motor phase current detection signal input via the low-pass filter 409, the leading phase φ for correcting a phase delay caused by the filter characteristics of the low-pass filter 410 is calculated. Since a PWM control signal is generated based on the corrected magnetic pole electric angle θ' obtained by adding the leading phase φ to the magnetic pole electric angle θ, the phase delay is reduced. As a result, defects such as flow ripple of a motor current and motor step-out are prevented, and motor driving stability can be improved.

Since the electric current and the voltage have different waveforms as shown in FIG. 6, optimum filter characteristics of the low-pass filters 409 and 410 are different from each other. However, it is preferable that the difference of the phase delay is smaller between current detection signals and voltage detection signals input into the rotational speed/magnetic pole position estimating section 407. For this reason, the low-pass filters having the same characteristics are used as the low-pass filters 409 and 410. In this case, the filter characteristics of the low-pass filter 409 is conformed to that of the low-pass filter 410 suitable for removing noises from the voltage detection signals.

Second Embodiment

Figure 11:
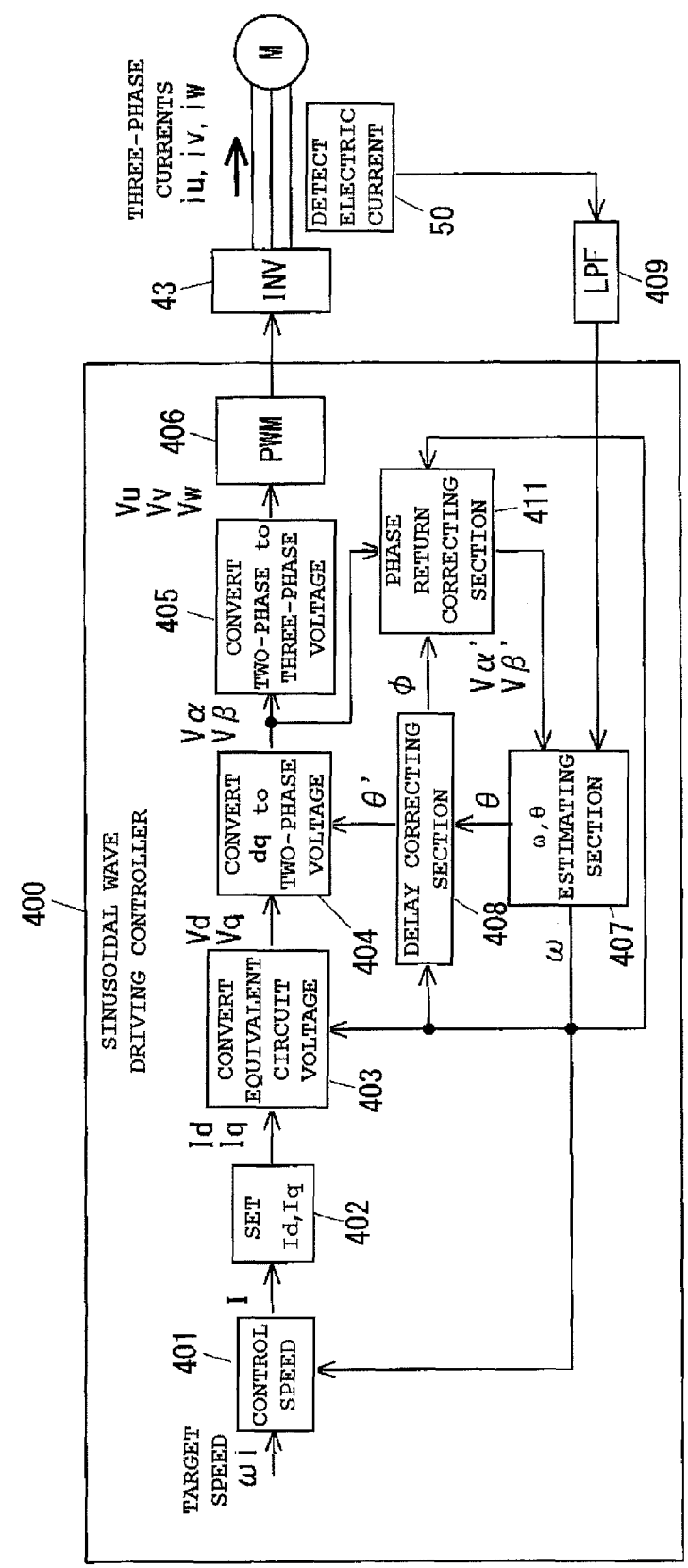
FIG. 11 is a block diagram describing the sinusoidal wave driving controller according to a second embodiment.
Figure 12:
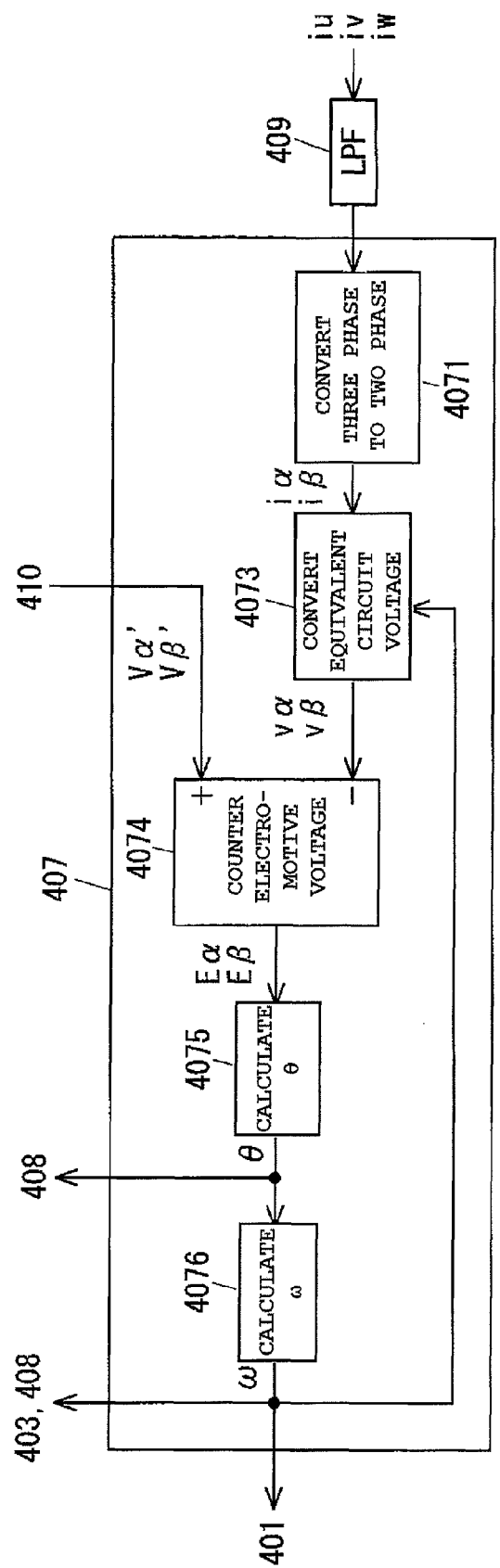
FIG. 12 a diagram illustrating details of the rotational speed/magnetic pole position estimating section according to the second embodiment.

FIGS. 11 and 12 are diagrams describing a second embodiment of the present invention. FIGS. 11 and 12 are diagrams corresponding to FIGS. 4 and 5 in the first embodiment. Portions different from the first embodiment are mainly described below.

In the first embodiment, as shown in FIG. 5 the counter electromotive voltage arithmetic section 4074 calculates the counter electromotive voltages Eα and Eβ according to the voltage signals vα and vβ based on the current detection signals detected by the current detecting section 50, and the voltage signals vα' and vβ' based on the voltage detection signals detected by the voltage detecting section 51.

On the other hand, in second embodiment, instead of the voltage signals vα' and vβ' based on the motor voltage detection signals, the phases of the voltage commands Vα and Vβ output from the dq-two-phase voltage converter 404 are corrected by a phase return correcting section 411, and the voltage signals Vα' and Vβ' as corrected results are input into the rotational speed/magnetic pole position estimating section 407. The rotational speed/magnetic pole position estimating section 407 calculates the counter electromotive voltages Eα and Eβ according to the voltage signals Vα' and Vβ' input from the phase return correcting section 411, and the voltage signals vα and vβ based on the motor current detection signals.

The phase return correcting section 411 delays the voltage commands Vα and Vβ output from the dq-two-phase voltage converter 404 by the same phase amount as the leading phase φ(ω) calculated by the delay correcting section 408. That is to say, the phases of the voltage commands Vα and Vβ (the corrected magnetic pole electric angle) θ' are replaced by "θ'−φ(ω)", and the replaced signals are the voltage signals Vα' and Vβ'. Since the voltage signals Vα' and Vβ' calculated in such a manner approximately match with the voltage signals vα' and vβ' based on voltage detection signals, the magnetic pole electric angle θ and the rotational speed ω that are the approximately same as those in the first embodiment are output from the rotational speed/magnetic pole position estimating section 407.

In the sinusoidal wave driving controller 400, the signals output from the low-pass filter 409 are sampled by a sampling frequency fs so as to be subjected to a digital process. In the phase return correcting section 411, when data is captured from the dq-two-phase voltage converter 404, for example, data that is retained at timing delayed only by a sampling number N given by the following formula (7), namely, the approximately same phase as the leading phase φ(ω).

$$N=\phi(\omega)\times(fs/\omega) \tag{7}$$

When a right side of the formula (7) is not an integer number, the closest integer number is determined as N. The units are ω [rad/s], fs [Hz], and φ [rad].

The method for setting the leading phase φ(ω) is based on the filter characteristics of the low-pass filter 409 similarly to that in the first embodiment. In the first embodiment, the filter characteristics of the low-pass filter 409 with respect to current detection signals are conformed to those of the low-pass filter 410, but in this embodiment the filter characteristics are set so as to be suitable for the current detection signals. For this reason, the phase delay of the magnetic pole electric angle θ calculated by the rotational speed/magnetic pole position estimating section 407 can be repressed to be smaller than that in the first embodiment.

In the constitution of the second embodiment where the rotational speed ω and the magnetic pole electric angle θ are estimated by using the calculated voltage commands Vα and Vβ, it is preferable that the phases of the voltage commands Vα and Vβ are delayed by the same phase as the leading phase φ(ω), and thus the signal delay of the current detection signals is aligned with the signal delay of the voltage signals Vα' and Vβ'. Also in the second embodiment, since the PWM control signal is generated based on the corrected magnetic pole electric angle θ' obtained by correcting the signal delay, similarly to the first embodiment, defects such as the flow ripple of the motor current and the motor step-out are prevented, so that the motor driving stability can be improved.

Third Embodiment

In the above first and second embodiments, for example, a current sensor that adopts a current transformer (CT) system utilizing a Hall effect is assumed as the current sensor (detecting section 50) for detecting electric currents flowing in the U, V and W-phase coils of the motor stator 10 (motor phase currents). In the third embodiment, the use of a more inexpensive current sensor provides the motor driving device of lower cost. The detection of the motor phase voltages is the similar to that in the first embodiment.

Figure 14:
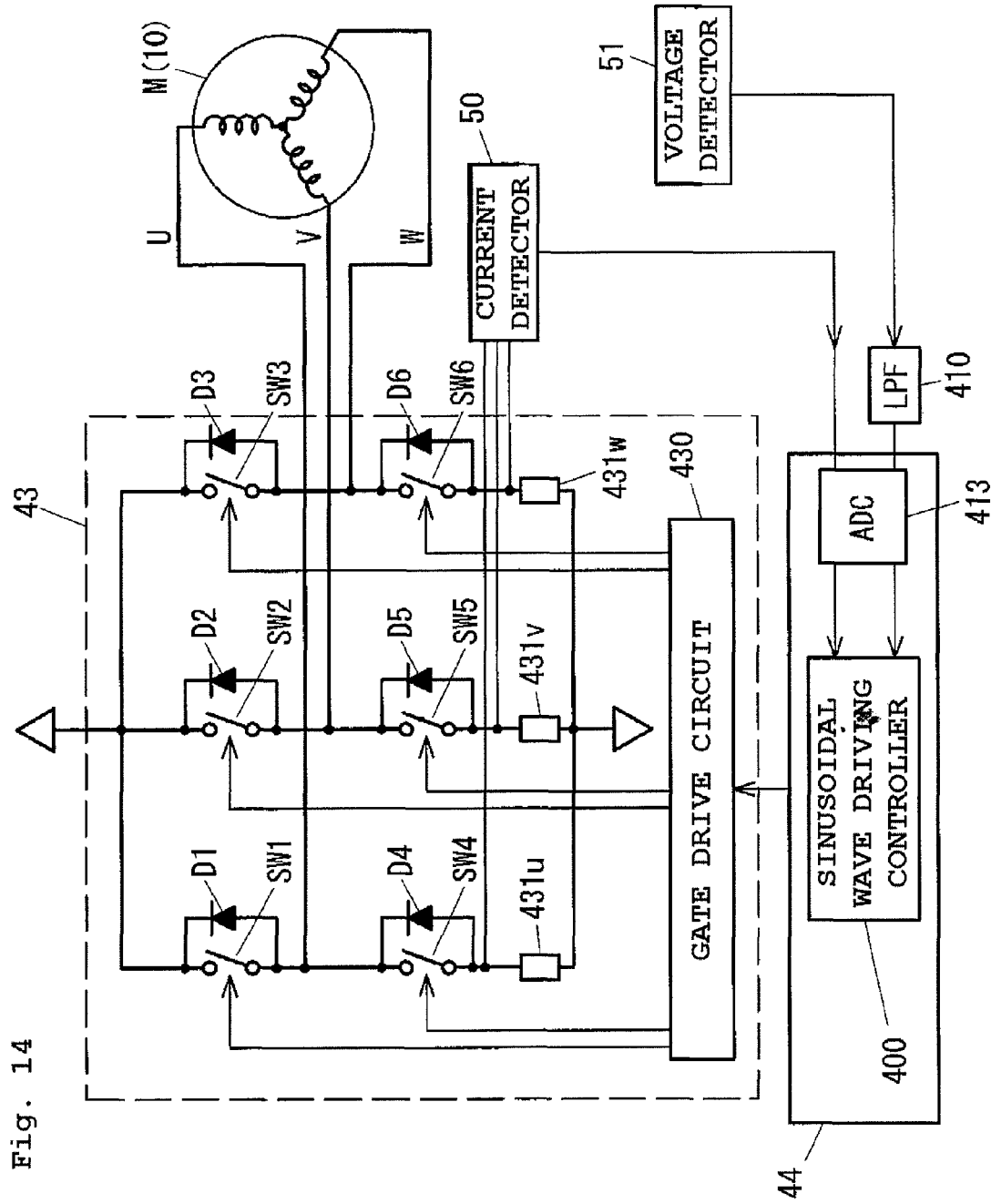
FIG. 14 is a block diagram illustrating a motor driving control system according to a third embodiment.
Figure 15:
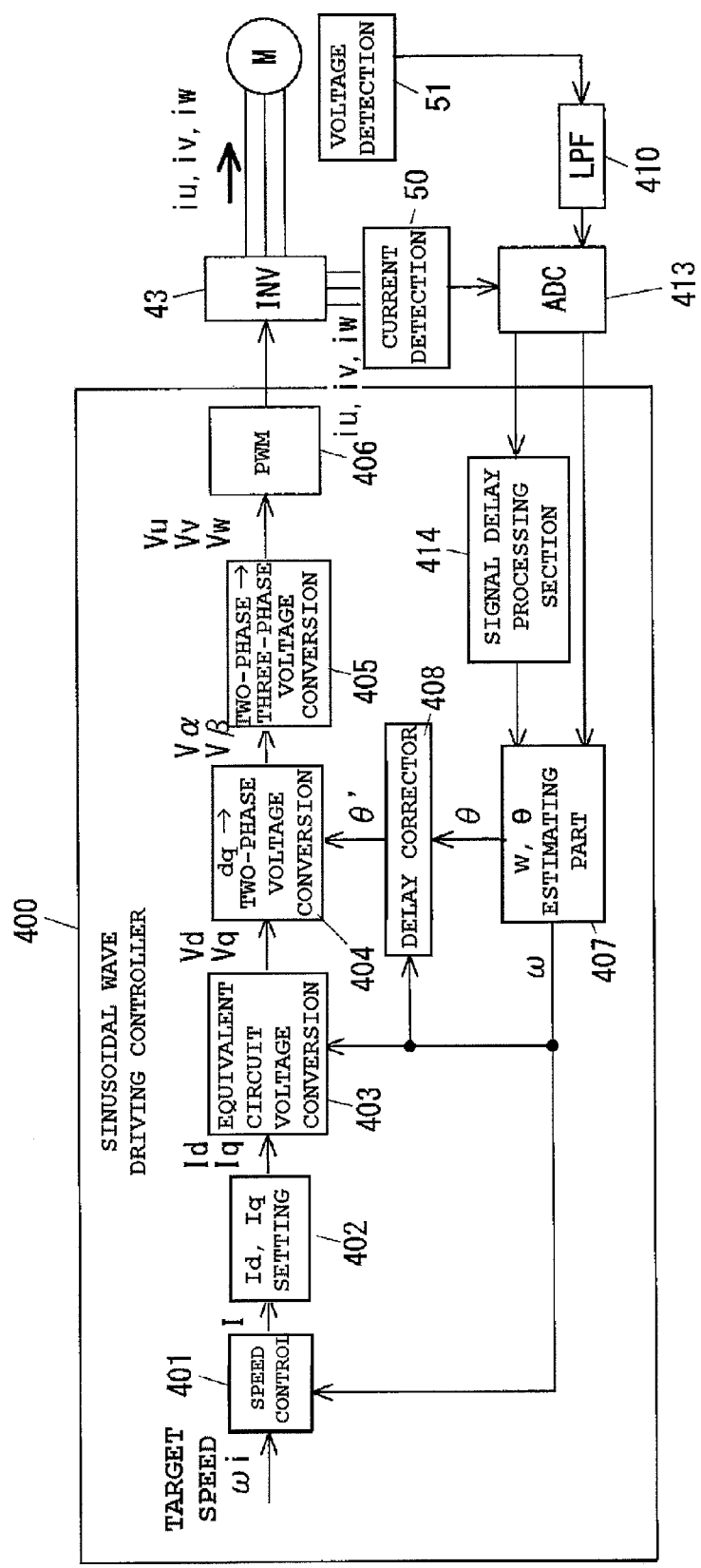
FIG. 15 is a diagram illustrating a sinusoidal wave driving controller according to the third embodiment.

FIG. 14 is a block diagram illustrating a motor driving control system according to the third embodiment. Further, FIG. 15 is a diagram illustrating the sinusoidal wave driving controller 400, and the diagram corresponding to FIG. 4 in the first embodiment. In the third embodiment, the current detecting section 50 detects a three-phase current through a publicly-known three shunt system (for example, Japanese Patent Application Laid-Open No. 63-80774 (1998). Shunt resistors 431u, 431v and 431w for detecting electric currents are connected in series to ground sides of the switching elements SW4, SW5 and SW6 of the inverter 43.

An electric current flows in the shunt resistor 431u at a timing when the switching element SW4 is ON (conductive state), and a voltage value of the shunt resistor 431u at that time is detected so that the current detecting section 50 can detect the U-phase current. Similarly, a voltage value of the shunt resistor 431v is detected at the timing when the switching element SW5 is ON so that the V-phase current is detected. A voltage current of the shunt resistor 431w is detected at the timing when the switching element SW6 is ON so that the W-phase current is detected.

Figure 16:
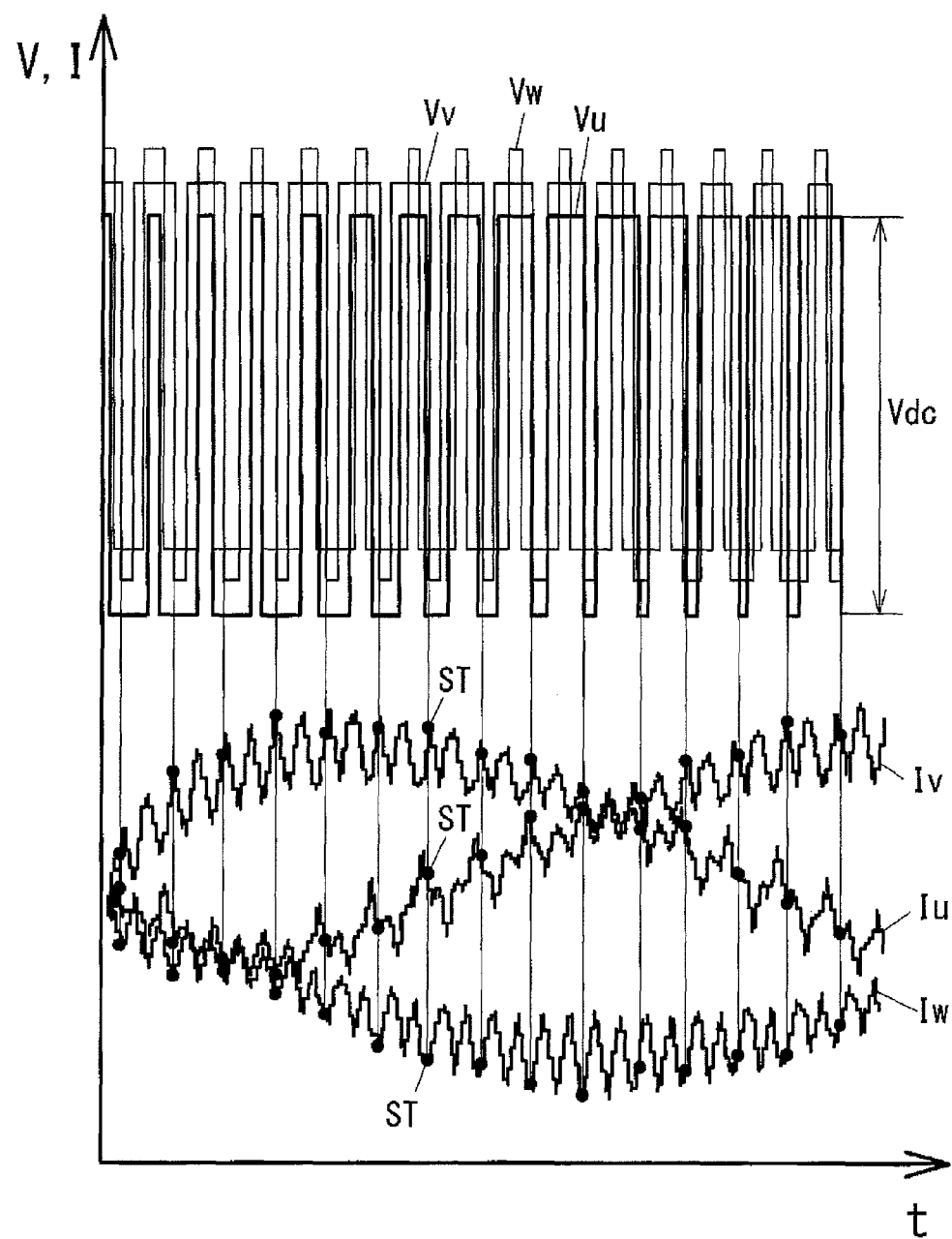
FIG. 16 is a diagram illustrating one example of a U-phase voltage Vu, a V-phase voltage Vv, a W-phase voltage Vw, a U-phase current iu, a V-phase current iv and a W-phase current iw when switching elements SW1 to SW6 undergo PWM sinusoidal wave driving.

FIG. 16 is a diagram illustrating one example of the U-phase voltage Vu, the V-phase voltage Vv, the W-phase voltage Vw, the U-phase current iu, the V-phase current iv and the W-phase current iw at the time when the switching elements SW1 to SW6 are subjected to the PWM sinusoidal wave-driving. The U-phase voltage Vu and the U-phase current iu are the same as those shown in FIG. 6 (L3 and L4). In FIG. 16, the lines of the U-phase voltage Vu, the V-phase voltage Vv and the W-phase voltage Vw are shifted in an up-down direction of the drawing (offset) for clear viewing.

The respective phase currents iu, iv and iw detected by the current detecting section 50 are captured into the controller 44 by an AD converter 413. In the three shunt system, the U-phase current iu, the V-phase current iv and the W-phase current iw are captured from the AD converter 413 at one timing periodically at every PWM period so as to be capable being acquired at the same timing.

As shown in FIG. 16, the U-phase voltage Vu, the V-phase voltage Vv and the W-phase voltage Vw output from the inverter 43 have a rectangular waveform that abruptly changes between 0 V and the power supply voltage Vdc according to on/off state of the switching elements. When the switching element on the low side is conductive, the respective-phase voltages are 0 V (on the GND basis). That is to say, a timing at which the three phases are commonly 0 V is a current detection timing.

Since On-duty of the rectangular waves of the respective phase voltages Vu, Vv and Vw change sinusoidally by PWM modulation, a duration as a phase current detection timing where the three phases are brought into the conductive state commonly varies at respective timings, and the duration is occasionally very short. For this reason, in the third embodiment, the constitution is such that the capturing from the AD converter 413 without a low-pass filter is carried out considering an influence of a signal delay due to the filter process. For example, the respective phase currents are captured into the AD converter 413 at timing when respective phase voltages are falling. Circular marks ST given to the respective phase current lines indicate the capturing timing, and the current values at that time are captured from the AD converter 413.

On the other hand, a motor phase voltage detection signal output from the voltage detecting section 51 is captured via the low-pass filter 410. For this reason, as described in the first embodiment, a phase delay that depends on the filter characteristics of the low-pass filter 410 occurs in the captured motor phase voltage detection signal. Therefore, in the third embodiment, a signal delay processing section 414 for delaying the phase current detection signal is provided as shown in FIG. 15 in order to match the phase of the motor phase voltage detection signal output from the AD converter 413 with the phase of the phase current detection signal output from the AD converter 413. That is to say, the phase of the phase current detection signal as a digital signal that is AD-converted by the AD converter 413 is delayed by a phase equivalent (the approximately same as) to the delay phase of the low-pass filter 410 by a digital arithmetic process in the signal delay processing section 414.

For example, at a rated speed ω0, the respective phase current detection signal data captured from the AD converter 413 are delayed by a delay time (D/ω0) corresponding to the delay phase D shown in FIG. 9. As a concrete digital process, the data are delayed by the number of samples N given by the formula (7) described in the second embodiment. In this case, when the signal delay processing section 414 captures data from the AD converter 413, it inputs the data captured at the timing delayed by the number of samples N given by the formula (7) to the rotational speed/magnetic pole position estimating section 407.

Alternatively, a digital filter may be provided as the signal delay processing section 414, and the signal delay processing section 414 may be realized by a digital filter process having the approximately same characteristics as the low-pass filter 410 to be applied to the motor phase voltage detection signal (for example, the characteristics in FIGS. 8 and 9). In this case, delays can be continuously corrected at various rotational speeds.

In the above-described first to third embodiments, the rotational speed ω and the magnetic pole electric angle θ of the motor rotor 11 are calculated based on information (the motor voltage detection signals or voltage commands) about the motor phase voltage and information (the motor current detection signals) about the motor phase current, and the phase delay of the calculated magnetic pole electric angle θ is corrected, so that the corrected magnetic pole electric angle θ' is generated. The PWM signal generating section 406 generates a PWM control signal for controlling ON/OFF of the switching elements SW1 to SW6 of the inverter 43 based on the three-phase voltage commands Vu, Vv and Vw generated from the current command I and the corrected magnetic pole electric angle θ'. As a result, an influence of the signal delay caused by the low-pass filters can be reduced, and the flow ripple of the motor current and the motor step-out are prevented so that the motor driving stability can be improved.

Like the first embodiment, when the rotational speed ω and the magnetic pole electric angle θ are calculated based on the motor phase voltage detection signal input via the low-pass filter 410 and the motor phase current detection signal input via the low-pass filter 409, the leading phase φ for correcting the phase delay caused by the filter characteristics of the low-pass filter 410 is calculated, and the leading phase φ is added to the magnetic pole electric angle θ so that the corrected magnetic pole electric angle θ' is generated. Normally, the low-pass filter 410 used for the voltage detection signals as signals with a shape of rectangular wave produces a higher noise reducing effect and has a larger phase delay amount. For this reason, the leading phase φ is set based on the filter characteristics of the low-pass filter 410 with the larger phase delay amount, so that a phase delay correcting effect can be produced.

Further, since the phase delay changes according to the rotational speed ω, the leading phase φ is calculated according to the rotational speed ω, so that the phase delay correction can be made effectively at various rotational speeds.

Further, the filter characteristics of the low-pass filter 409 are set so as to be identical to the filter characteristics of the low-pass filter 410 so that the phase delay of the current detection signals and the phase delay of the voltage detection signals input into the rotational speed/magnetic pole position estimating section 407 can be conformed to each other. As a result, estimating accuracy of the magnetic pole electric angle θ can be improved.

Further, like the second embodiment, in the constitution where the rotational speed ω and the magnetic pole electric angle θ are calculated based on the two-phase voltage commands Vα and Vβ and the current detection signals input via the low-pass filter 409, it is preferable that the phase of the two-phase voltage commands Vα and Vβ are delayed by the same phase amount as the leading phase φ. The leading phase φ is an electric angle for correcting the phase delay caused by the filter characteristics of the low-pass filter 409, and is set based on the filter characteristics of the low-pass filter 409. Also in this case, the leading phase φ is calculated according to the rotational speed w, so that the phase delay correction can be made effectively at various rotational speeds.

Further, like the third embodiment, when the motor phase voltage detection signal is input via the low pass filter 410 and the phase current detection signal detected by the three shunt system is not subjected to the filter process and is input, the phase current detection signal captured by the AD converter 413 is subjected to the digital process for delaying a signal by the signal delay processing section 414 by the same phase as that of the low-pass filter 410. The rotating speed ω and the magnetic pole electric angle θ are calculated based on the phase current detection signal subjected to the digital process and the motor phase voltage detection signal captured from the AD converter 413. Further, the leading phase φ for correcting the phase delay caused by the filter characteristics of the low-pass filter 410 is calculated, and the leading phase φ is added to the magnetic pole electric angle θ so that a corrected magnetic pole electric angle θ' is generated. Also in this case, the phase delay correcting effect that is similar to that in the first embodiment can be obtained.

The motor driving device is applied to the vacuum pump such as a turbo-molecular pump for rotating a pump rotor at a high speed, so that the vacuum pump with high driving stability can be provided.

In the above embodiments, a two-phase fixed coordinate is applied, and the magnetic pole position θ and the rotational speed ω are estimated, but the present invention is not limited to two-phase fixed coordinate. For example, it can be applied also to a case in which after the two-phase fixed coordinate is converted into a rotary coordinate system, the estimated calculation is performed. In this embodiment, the rotational speed ω is calculated based on magnetic pole position θ, but the present invention is not limited to this. For example, the calculation can be made from values of three-phase (or two-phase) voltages and electric currents.

The above description is only one example, and the understanding of the present invention is not limited or restrained by a correspondence relation between the description in the embodiments and description in claims. For example, the above embodiments describe the magnetic bearing type turbo-molecular pump as an example, but the present invention is not limited to this, and the present invention can be applied to a ball bearing type turbo-molecular pump or the vacuum pump requiring high-speed rotation. Further, the detection of the motor phase current and the phase voltage is shown by three-phase inputs, but as publicly known, only two phases are input, and residual one phase may be calculated based on the other two phases. When only U-phase and V-phase currents and voltages are detected, W phase current and voltage can be calculated according to iw=−iu−iv and vw=−vu−vv. Only two-pole motor (FIG. 7) is described here, but the present invention is not limited to the two-pole motor, and can be applied also to multi-pole motors such as a four-pole motor by replacing an electric angle for multi-pole.

What is claimed is:

1. A motor driving device comprising:
an inverter having a plurality of switching elements for driving a motor;
an arithmetic section for calculating a rotational speed and a magnetic pole electric angle of a motor rotor based on information about a motor phase voltage and information about a motor phase current;
at least one low-pass filter for removing noise of at least one of the motor phase voltage and the motor phase current;
a delay correcting section for correcting a phase delay of the magnetic pole electric angle calculated by the arithmetic section so as to generate a corrected magnetic pole electric angle, the phase delay being predetermined based on filter characteristics of the at least one low-pass filter;
a driving command generating section for generating a sinusoidal wave driving command based on a difference between the rotational speed and a target rotational speed and the corrected magnetic pole electric angle; and
a PWM signal generating section for generating a PWM control signal for controlling on/off of the plurality of switching elements based on the sinusoidal wave driving command, wherein
the information about the motor phase voltage is a motor phase voltage detection signal input via a first low-pass filter included in the at least one low-pass filter, and the information about the motor phase current is a motor phase current detection signal input via a second low-pass filter included in the at least one low-pass filter,
filter characteristics of the second low-pass filter are set so as to be identical to filter characteristics of the first low-pass filter, and
the delay correcting section calculates a leading phase for correcting a phase delay caused by the filter characteristics of the first low-pass filter, and adds the leading phase to the magnetic pole electric angle so as to generate the corrected magnetic pole electric angle.

2. The motor driving device according to claim 1, wherein the delay correcting section calculates the leading phase according to the rotational speed calculated by the arithmetic section.

3. A motor driving device comprising:
an inverter having a plurality of switching elements for driving a motor;
an arithmetic section for calculating a rotational speed and a magnetic pole electric angle of a motor rotor based on information about a motor phase voltage and information about a motor phase current;
at least one low-pass filter for removing noise of at least one of the motor phase voltage and the motor phase current;
a delay correcting section for correcting a phase delay of the magnetic pole electric angle calculated by the arithmetic section so as to generate a corrected magnetic pole electric angle, the phase delay being predetermined based on filter characteristics of the at least one low-pass filter;
a driving command generating section for generating a sinusoidal wave driving command based on a difference between the rotational speed and a target rotational speed and the corrected magnetic pole electric angle; and
a PWM signal generating section for generating a PWM control signal for controlling on/off of the plurality of switching elements based on the sinusoidal wave driving command, wherein
the information about the motor phase current is a motor phase current detection signal input into the arithmetic section via a first low-pass filter included in the at least one low-pass filter,
the delay correcting section calculates a leading phase for correcting a phase delay caused by filter characteristics of the first low-pass filter, and adds the leading phase to the magnetic pole electric angle so as to generate the corrected magnetic pole electric angle, the driving command generating section generates two-phase voltage commands Vd and Vq in a two-phase rotary coordinate system based on the difference, converts the two-phase voltage commands Vd and Vq into two-phase voltage commands vα and vβ in a two-phase fixed coordinate system based on the corrected magnetic pole electric angle, two-phase-to-three-phase converts the two-phase voltage commands vα and vβ so as to generate the three-phase voltage commands Vu, Vv and Vw, and generates the PWM control signal based on the three-phase voltage commands Vu, Vv and Vw, and the arithmetic section calculates the rotational speed and the magnetic pole electric angle based on an estimated motor voltage obtained by delaying phase of the two-phase voltage commands vα and vβ in the two-phase fixed coordinate system by the same phase amount as the leading phase, and the motor current detection signal.

4. The motor driving device according to claim 3, wherein the delay correcting section calculates the leading phase according to the rotational speed calculated by the arithmetic section.

5. A motor driving device comprising:

an inverter having a plurality of switching elements for driving a motor;

an arithmetic section for calculating a rotational speed and a magnetic pole electric angle of a motor rotor based on information about a motor phase voltage and information about a motor phase current;

at least one low-pass filter for removing noise of at least one of the motor phase voltage and the motor phase current;

a delay correcting section for correcting a phase delay of the magnetic pole electric angle calculated by the arithmetic section so as to generate a corrected magnetic pole electric angle, the phase delay being predetermined based on filter characteristics of the at least one low-pass filter;

a driving command generating section for generating a sinusoidal wave driving command based on a difference between the rotational speed and a target rotational speed and the corrected magnetic pole electric angle;

a PWM signal generating section for generating a PWM control signal for controlling on/off of the plurality of switching elements based on the sinusoidal wave driving command;

a motor phase voltage detecting section for detecting a motor phase voltage;

a first low-pass filter included in the at least one low-pass filter for performing a low-pass filter process on a motor phase voltage detection signal output from the motor phase voltage detecting section;

a three-shunt type current detecting section for detecting a motor phase current through a shunt resistor provided to a ground side of the switching element of the inverter; and a signal delay processing section for delaying a motor phase current detection signal that is output from the current detecting section and is analog-digital converted by a phase equivalent to the phase delay of the motor phase voltage detection signal through the first low-pass filter according to a digital process, wherein the information about the motor phase voltage is the motor phase voltage detection signal that is analog-digital converted after the filter process is performed by the first low-pass filter, the information about the motor phase current is a the phase corrected motor phase current detection signal that is output from the signal delay processing section, and the delay correcting section calculates a leading phase for correcting the phase delay caused by the filter characteristics of the first low-pass filter, and adds the leading phase to the magnetic pole electric angle so as to generate the corrected magnetic pole electric angle.

6. The motor driving device according to claim 5, wherein the digital process is a low-pass filter process through a digital low-pass filter.

7. A vacuum pump comprising:

a pump rotor formed with an exhaust function section;

a motor for driving to rotate the pump rotor; and the motor driving device according to claim 1 for driving the motor.

* * * * *